United States Patent [19]

Varaiya et al.

[11] Patent Number: 4,754,397
[45] Date of Patent: Jun. 28, 1988

[54] FAULT TOLERANT MODULAR SUBSYSTEMS FOR COMPUTERS

[75] Inventors: Rooshabh Varaiya, Cupertino; David S. Ng, Saratoga; Armando Pauker, Sunnyvale; Joerg U. Ferchau, Morgan Hill, all of Calif.

[73] Assignee: Tandem Computers Incorporated, Cupertino, Calif.

[21] Appl. No.: 853,537

[22] Filed: Apr. 18, 1986

Related U.S. Application Data

[63] Continuation-in-part of Ser. No. 702,108, Feb. 15, 1985, abandoned.

[51] Int. Cl.⁴ .................... G06F 11/18; H05K 5/00
[52] U.S. Cl. .................... 364/200; 360/97; 360/86; 360/133; 360/98; 369/34; 369/12; 369/75.1; 364/708; 364/900
[58] Field of Search .............. 360/55, 137, 98, 99, 360/86, 133, 97; 369/34, 36, 75.1, 292, 12; 364/200, 900, 708

[56] References Cited

U.S. PATENT DOCUMENTS

| | | | |
|---|---|---|---|
| 4,062,049 | 12/1977 | Dirks | 360/98 |
| 4,093,985 | 6/1978 | Das | 364/200 |
| 4,356,546 | 10/1982 | Whiteside | 364/200 |
| 4,359,762 | 11/1982 | Stollorz | 360/133 |
| 4,479,198 | 10/1984 | Romano et al. | 364/708 X |
| 4,504,936 | 3/1985 | Faber et al. | 369/34 |
| 4,633,350 | 12/1986 | Hanson | 369/36 X |

Primary Examiner—Robert L. Richardson
Attorney, Agent, or Firm—Townsend and Townsend

[57] ABSTRACT

A fault tolerant computing facility is disclosed. The facility includes a housing array for containing a plurality of hardware element modules such as disk drives, a plurality of modularized power supplies and plural power distribution modules, each being connected to a separate source of primary facility power. Each module is self aligning and blind-mateable with the housing and may be installed and removed without tools, without disturbing the electrical cabling within the cabinet, and automatically by a maintenance robot. The logical identity of each module is established by programming at a control panel and by corresponding physical location of installation of each module within the housing array.

27 Claims, 7 Drawing Sheets

FAULT TOLERANT MODULAR SUBSYSTEMS FOR COMPUTERS

CONTINUING DATA

This application is a continuation-in-part of U.S. patent application Ser. No. 06/702,108 filed on Feb. 15, 1985, now abandoned.

BACKGROUND OF THE INVENTION

The present invention relates to computing systems formed of one or more arrays of interconnected hardware modules. More particularly, the present invention relates to a digital computer system in which its capacity and fault tolerance are determined by the number and arrangement of modular hardware elements installed in and thereby connected in one or more receptacle arrays. Robotic installation and removal of modules in the environment of the arrays is an aspect of the present invention.

The assignee of the present invention has pioneered the concept of fault tolerance in connection with computing system. Basically, that concept holds that failure of one element or subsystem of a computing system should never be permitted to cause the whole system to fail. In practice, the use of parallel processors, parallel data paths to peripheral equipment and parallel power supplies has resulted in a fault tolerant computing system which has significantly advanced the art. This advance is documented, for example, in U.S. Pat. No. 4,228,496, the disclosure of which is incorporated herein by reference.

In practice, discrete hardware elements of a computer, such as processors, peripheral device controllers, central memory, data mass storage devices, and power supplies are formed as separate hardware elements, and these elements are typically interconnected by cabling, and sometimes by direct plug in connection to back planes or mother boards.

On commonly encountered hardware element is the rotating data storage device, sometimes called "disk drive". Disk drives, whether based on magnetic or optical storage technologies, are frequently used in computing systems to provide rapid, random access to stored data. Over the years, disk drive technology has progressed to a point where a massive amount of data may now be stored in a disk drive device using small diameter non-removable disks (e.g. eight inch) and having a very small physical package.

Heretofore, the servicing of existing digital computer systems, including systems practicing fault tolerance, has involved the disconnection of cables and harnesses interconnecting the various subsystems such as disk drives. Such servicing has typically included the removal and reinstallation of cabinetry and mounting hardware. Because of the way in which prior computering systems have been designed, constructed and assembled, removal of a circuit board or a cable during servicing has either required that all primary power to the subsystem be removed or has led to failure of backup or mirror subsystems, causing a single point failure within the computing system.

Also, the manner in which computing systems have been assembled has not been conducive of automatic maintenance procedures. While industrial robots are known and widely employed in industrial manufacturing processes, little if any effort has been given to the adaptation of computing systems and programmed robotic equipment to facilitate automatic maintenance procedures.

Thus, a hitherto unsolved need has arisen for a fault tolerant digital computer incorporating subsystems and hardware elements thereof which may be serviced, either manually or automatically by robotic maintenance equipment, without disturbance of the cabinet and cabling housing and connecting the disk drive to be serviced.

SUMMARY OF THE INVENTION WITH OBJECTS

A general object of the present invention is to provide a fault tolerant computing system formed of multiple subsystems of uniform hardware modules in one or more interconnecting arrays which overcomes the limitations and drawbacks of the prior art.

Another object of the present invention is to provide an array for multiple hardware elements such as disk drives which facilitates configurations of a single string of disk drives or two separate strings of disk drives without installation of any additional internal cabling within the array.

A further object of the present invention is to provide improved packaging for hardware element of a fault tolerant computing system such as a data storage subsystem formed of one or more strings of multiple disk drives which achieves a significant improvement in serviceability and overall system reliability, and which makes the subsystem less sensitive to facility power faults.

Yet another object of the present invention is to provide a housing for mating with hardware attachment carrier modules of a computing system in a manner which enables the module to be accepted into the housing and thereupon automatically connected with power, control and data signals, control panel functions and provided with cooling without the use of tools and without need for access to the cabling installed within the cabinet.

A further object of the present invention is to provide a housing for receiving multiple uniformly sized hardware element modules and a mating attachment carrier module for each hardware element, such as a disk drive, in the form of a drawer which is mechanically and electrically blind-mateable with the housing so as not to require special adjustment of alignment in order for the hardware element it is carrying to the placed in service.

One more object of the present invention is to provide a housing for multiple hardware element modules which receives a power supply for each module in close proximity to the modules in order to minimize power supply cabling lengths and which enables the supply to be accepted into the housing and thereupon automatically connected to the power distribution cabling of the housing without the use of tools and without need for access to the cabling installed within the housing.

Yet another object of the present invention is to provide a housing, a first primary power distribution module (PDM) powered from one facility primary power source, and a second back up or mirror image primary PDM powered from another primary power source within the facility, with the first PDM supplying power to first hardware elements such as disk drives, first primary power supplies and one half of the cooling apparatus, and with the second PDM supplying power to second hardware elements such as back up, mirror image disk drives, back up power supplies and the other half of the cooling apparatus, so that loss of one facility power buss or circuit breaker will not cause the entire subsystem to fail.

One further object of the present invention is to provide a fault tolerant computing system facility comprising modularized elements blind-mateable with a housing providing all interconnections so as to enable removal and replacement of each element by one or more programmed robots.

In accordance with the present invention, a fault tolerant digital computer subsystem includes a housing. The housing includes provisions for receiving a plurality of modularized hardware elements, such as disk drives for example, including at least one primary module and at least one back up mirror module. A plurality of modularized power supplies are receivable within the housing, there being a separate power supply module electrically associated with each separate hardware module. At least two separate power distribution modules (PDM's) are provided in the housing. One PDM distributes primary power from a first facility primary source connection to the primary modules and power supply modules associated with primary modules, and one half of cooling apparatus in the housing, and a second PDM distributes primary power from a second facility primary source connection to back up mirror modules and power supply modules associated with back up mirror modules and the other half of the cooling apparatus within the housing. Cabling within the housing enables the hardware modules and the power supply modules to be mechanically and electrically blind-mateable by providing automatic disconnect and reconnect when the modules are removed and inserted into the cabinet, without the use of tools, either by hand or by robotic maintenance equipment.

An electrical configuration arrangement in the housing which is cooperatively associated with the cabling enables said subsystem to be alternatively configured as a single string of hardware modules and as multiple strings of hardware modules without physical modification of the internal cabling.

A control panel is provided for configuring logically each module and for indicating condition of the hardware modules and power supply modules installed in the cabinet.

These objects, advantages and features will be further appreciated and better understood upon consideration of the following detailed description of a preferred embodiment, presented in conjunction with the accompanying drawings.

DETAILED DESCRIPTION OF PREFERRED EMBODIMENTS

Disk Drive Data Storage Subsystem 10

Figure 1:
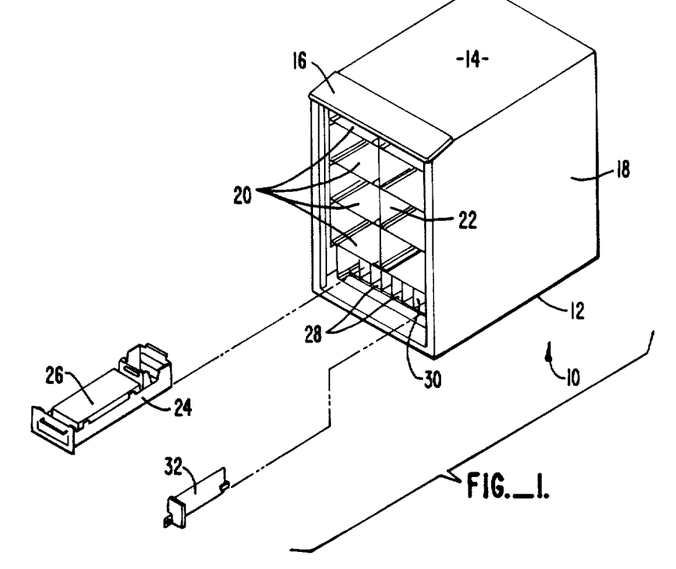
FIG. 1 is an orthogonal view of the front side of one presently preferred embodiment of the invention including a cabinet for receiving multiple disk drive and power supply modules. A front door has been omitted to facilitate illustration of the cabinet structure.

A first preferred embodiment of the present invention is illustrated as a fault tolerant multiple disk drive data storage subsystem 10, depicted in FIGS. 1 through 7. As seen in FIG. 1, the subsystem 10 is illustrated as being contained in a small cabinet 12 which requires, for example, about six square feet of floor space, and stands about three feet in height. The cabinet 12 includes a top 14, a control panel 16 and sidewalls 18. The beveled, transparent control panel 16 is secured to the top 14 at the front of the cabinet 12. The control panel provides for access to configuration controls and acts as a window for light emitting signalling devices 17 which indicate the status of the disk drives installed within the cabinet 12. The logical identities of the disk drives installed within the cabinet 12 are established by programmable identification plugs which may be inserted into and removed from the control panel 16.

Inside the cabinet, shelves 20 and vertical dividers 22 are provided to define spaces for eight disk drive carrier module drawers 24. Each drawer 24 contains a disk drive 26, such as a fixed rotating multiple eight-inch disk magnetic media data storage device having a data storage capacity of 168 megabytes, unformatted, for example. While magnetic media storage disks are preferred, it is to be understood that the cabinet and drawer arrangement may be used effectively with a wide variety of hardware elements of a fault tolerant computing system. With eight drives 26 installed in the cabinet 12, the subsystem provides an overall data storage capability of 1.344 gigabytes of unformatted data. A shelf 28 at the bottom of the cabinet 12, and vertical dividers 30, define spaces for eight plug-in disk drive power supply modules 32. Thus, there is a separate power supply module 32 provided for each disk drive module and each power supply module 32 is located in close proximity with its associated disk drive module drawer 24.

A plurality of fans, not shown, are provided on a front door of the cabinet 12, also not shown, to provide a portion of the cooling required to maintain the interior of the cabinet within proper ambient operating range.

Figure 2:
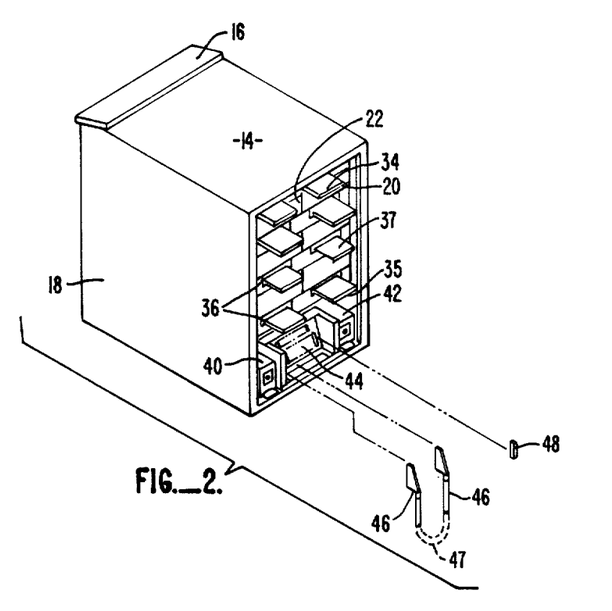
FIG. 2 is an orthogonal view of the back side of the cabinet depicted in FIG. 1. A rear door has been omitted to facilitate illustration.
Figure 3:
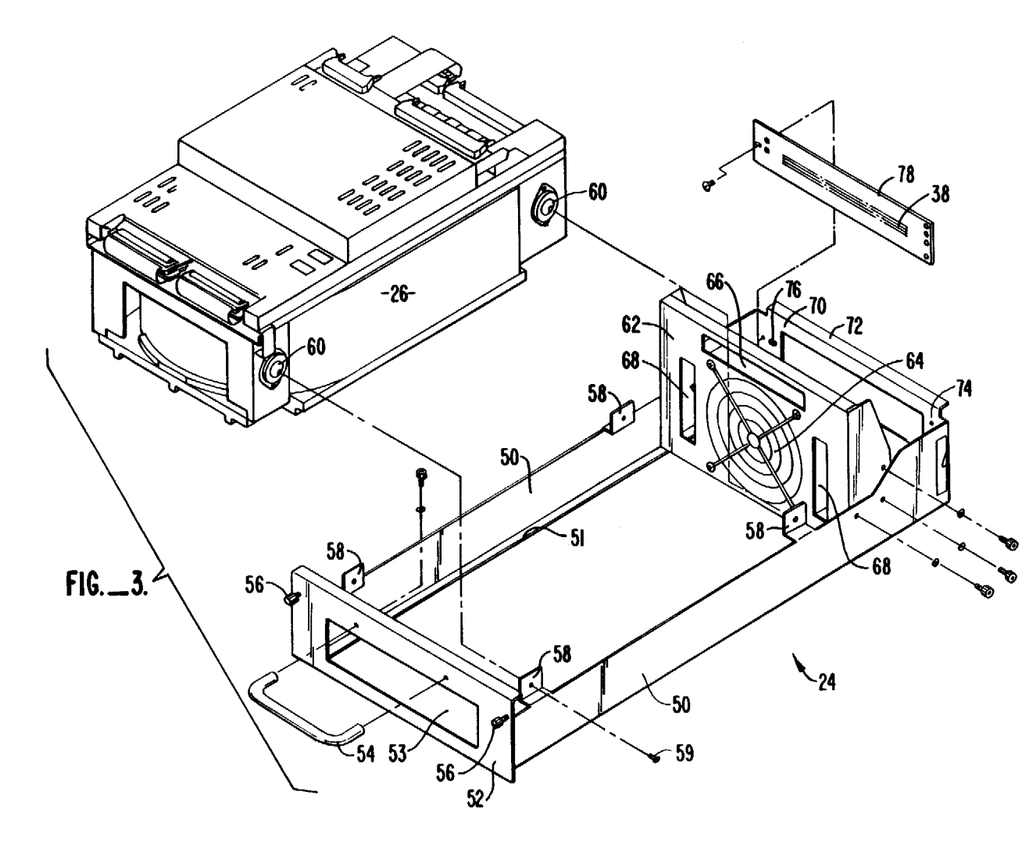
FIG. 3 is an enlarged exploded orthogonal view of a drive and drive carrier module drawer illustrated in FIG. 1.

Turning to FIG. 2, each disk drive shelf 20 is provided with an electrical connection backplane 34. The backplane structure 34 includes a connector plug 36 for mating with a complementary connector jack 38 located on the back of the disk drive carrier drawer, as seen in FIG. 3. All power, control and data connections for the disk drive 26 pass through the plug 36 and jack 38, as a single location of connection. The backplane structure 34 includes a horizontal metal support plate 35 and a printed circuit connection board 37 having connection traces aligned along a rearward edge thereof. Data cabling, not shown, is provided to connect each connection board 37 with an associated drive jack on a data cable connection plane 44 located at the rear of the cabinet 12 and below the shelves 20, as shown in FIG. 2. Once the data cabling is connected to each connection board, electrical/logical configuration of the disk drives 26 in the cabinet 12 may be made by connections at the connection plane 44.

A primary facility power distribution module 40 is connected to a first source of facility primary power. The module 40 distributes primary power to one half of the power supply modules: for example, modules 32A, 32C, 32E and 32G, which are associated with primary drives 26A, 26C, 26E, and 26G, as shown (sic: in) FIG. 4. A mirror facility power distribution module 42 is connected to a second source of facility primary power. The module 42 distributes primary power to the other half of the power supply modules: modules 32B, 32D, 32F, and 32H, which are associated with mirror drives 26B, 26D, 26F, and 26H.

Figure 4:
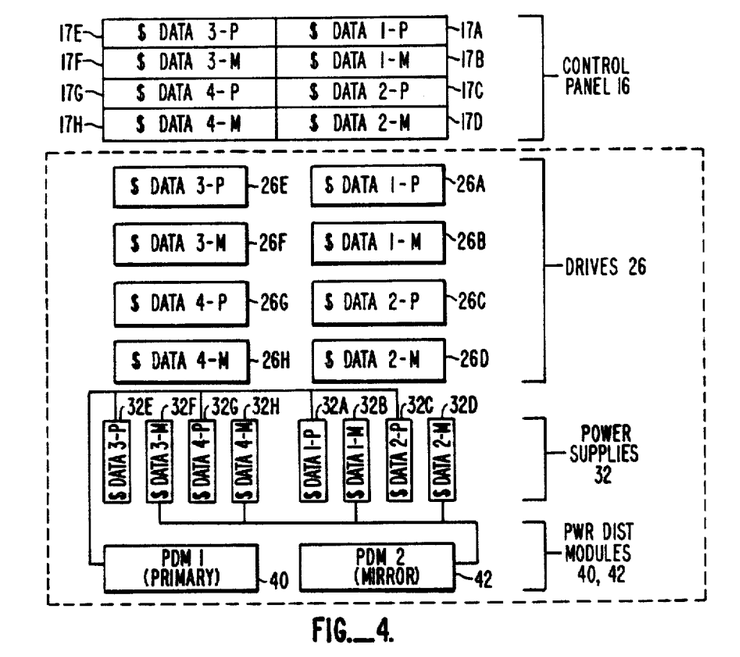
FIG. 4 is a diagram of the logical organization of the disk drives and power supply distribution connections within the cabinet depicted in FIG. 1.

It is to be understood that the subsystem 10 achieves a first level of fault tolerance by providing a backup or mirror drive for each primary drive 26. Thus, the drive 26B "mirrors" and backs up the drive 26A by containing the same useful data therein as is stored in the primary drive. In the event of a failure of one source of facility primary power, rendering one of the drives 26A or 26B inoperative, the other drive, containing a mirror image of the data held in the first drive remains on line and available for use without interruption in computing service.

Cables 46 facilitate connection of the subsystem 10 to two parallel processors of the type described in the referenced U.S. Pat. No. 4,228,496. Termination plugs 48 contain suitable termination resistances so that the impedances of the cables 46 are properly matched and so that standing waves do not interfere with high speed data and control signal transmissions from the supervisory parallel processors and the disk drives 26.

Details of the disk drive carrier drawer module 24 are illustrated in FIG. 3. Therein the drawer 24 is seen to include two opposite and parallel side rails 50 having lower longitudinal reinforcing lips 51. A front panel 82 is joined to the front ends of the opposed side rails 50. The panel defines a rectangular opening 53 which facilitates passage of cooling air currents about the disk drive 26. The panel 82 also includes provision for a handle 84 and for two knurled looking screws 56 which mate with corresponding threaded portions at the front of the cabinet 12 to lock the drawer 24 in position within the cabinet 12.

Four inset L-shaped brackets 58 are integrally formed with the side rails 50. These brackets 58 define mounting holes which are aligned with threaded mounting members of four sidemounted shock absorbers 60 of the disk drive 26. The spacing of the side walls 50 and of the brackets 88 is such as to accommodate the mounting dimensions of the disk drive 26. In practice, a disk drive model No. M-2322K available from Fujitsu America, Inc., 3058 Orchard Drive, San Jose, Calif. 95134-2017, is presently preferred as the implementing drive 26. Screws 89 are used to mount the disk drive 26 to the drawer 24 at the bracks 58, as diagrammed in FIG. 3.

A transverse fan bracket 62 is mounted by screws to the side rails 50 at a location just behind the space provided for the drive 26. The bracket 62 supports a cooling fan 64 which forces cooling air currents to pass over the disk drive 26 for carrying away heat generated from the spindle motor, actuator motor and electronics of the disk drive. The fan 64 is connected to the facility distribution module 40 or 42 which supplies power to the power supply 32 associated with the particular drive. The fan bracket includes an opening 66 for a data and control cable which connects the drive 26 and the jack 38, and which also provides a second handle to facilitate lifting of the drawer during installation and removal. Side openings 68 are also defined by the fan bracket 62, and these openings facilitate other connections to the disk drive 62 and also the circulation of cooling air currents.

A rear end plate 70 is formed integrally with the side rails 50, and the plate includes an upper transverse reinforcing lip 72. A machined, precise alignment opening 74 is defined through the end plate 70 on the right side, as shown in FIG. 3, and a second, oval alignment opening 76 is formed through the left side of the end plate 70. Tapered alignment pins extending toward the front of the cabinet are provided on the vertical portion of the backplane structure 34. These pins enter the openings 74 and 76 and automatically register and align the plug 36 and jack 38 prior to engagement thereof as the drawer 24 is slid along the shelf, until the plug and jack mate as the drawer 24 reaches its installation position within the cabinet 12. Then, the screws 56 are rotated manually to secure the drawer 24 in place.

It will be understood from FIGS. 4-7 that the logical and electrical identification of each disk drive 26 is established by the physical location of the disk drive within the cabinet 12. Thus, as seen from the front, the upper right drive 26A, the first primary drive, is mirrored by the drive 26B just below it. The next primary drive 26C is mirrored by the drive 26D at the lower right. The upper left third primary drive 26E is mirrored by its back up drive 26F, and the fourth primary drive 26G is mirrored by its back up drive 26H at the lower left.

The control panel 16 is arranged as shown in FIG. 4 so that an indicator display 17 is associated with each drive 26. Thus, the indicator display 17A displays the status of the drive 26A, display 17B displays the status of the drive 26B, display 17C displays the status of the drive 26C, display 17D displays the status of the drive 26D, display 17E displays the status of the drive 26E, display 17F displays the status of the drive 26F, display 17G displays the status of the drive 26G, and display 17H displays the status of the drive 26H.

Figure 5:
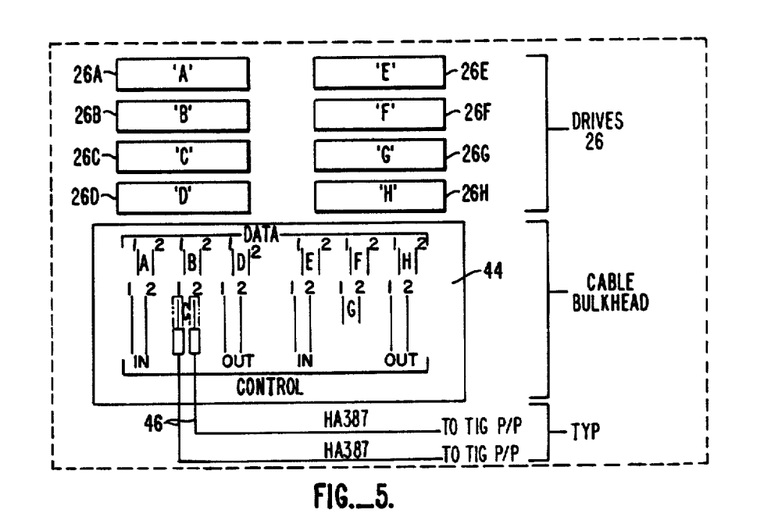
FIG. 5 is a diagram of the external data cable orientation and connections of the cabinet depicted in FIG. 1.

Each disk drive 26 is provided with two data connectors on the data cable connector plane 44 as shown schematically in FIG. 5. This dual connection arrangement facilitates connection of each drive 26 to two disk drive controllers of the fault tolerant parallel processing system to which the subsystem 10 is connected. If one controller or its cabling fails in service, the other controller remains on line, thereby providing fault tolerance of the overall system.

Figure 6:
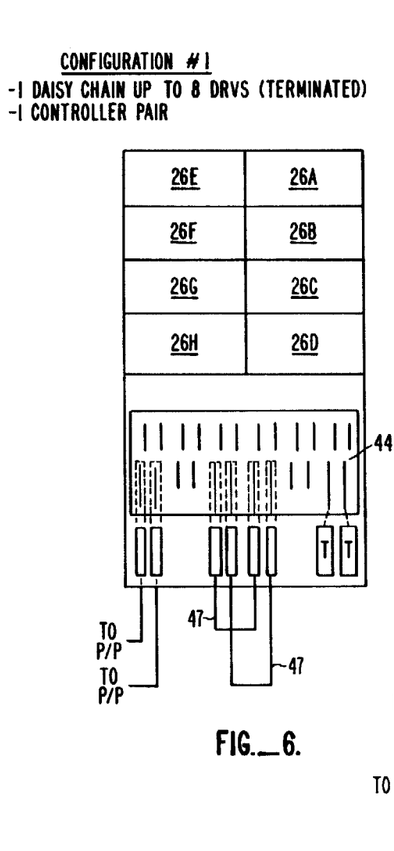
FIG. 6 is a schematic diagram of external data cable, jumper and termination connection facilitating a single string configuration for the drives contained in the cabinet depicted in FIG. 1.

Jumper cables 47 and terminations 48 enable the subsystem 10 to be configured as a single daisy-chained array of storage devices as shown in FIG. 6. The term "daisy-chain" as used herein is synonymous in meaning with party line, broadcast mode or unibus and means that a disk drive controller broadcasts each control message to all of the disk drives of the chain even though the message is intended only for one of them. The particular disk drive 26 for which the message is intended recognizes the message and responds to the controller, also typically via a common communication path. Other connection arrangements, such as private lines between each disk drive 26 and the controller are within the purview of the present invention.

Figure 7:
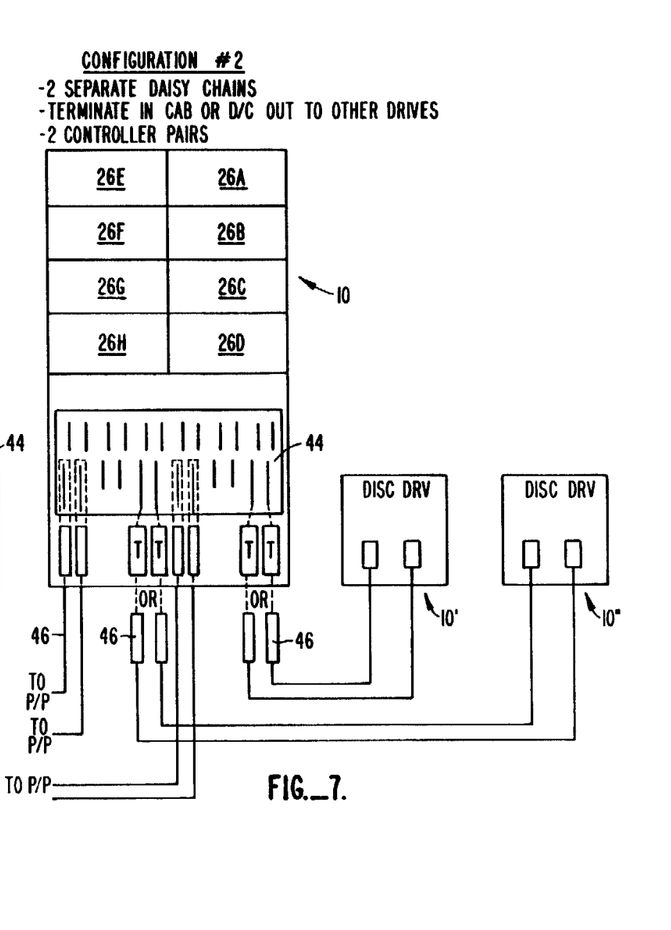
FIG. 7 is a schematic diagram of external data cable and termination connections facilitating a two string configuration for the drives contained in the cabinet depicted in FIG. 1, and further illustrating daisy chaining of a plurality of subsystems of the type depicted in FIG. 1.

Alternative connections, shown in FIG. 7 enable the subsystem 10 to be multiple daisy-chained internally, and in connection to two other like subsystems 10' and 10".

Modular Fault Tolerant Computing Facility 100

Figure 8:
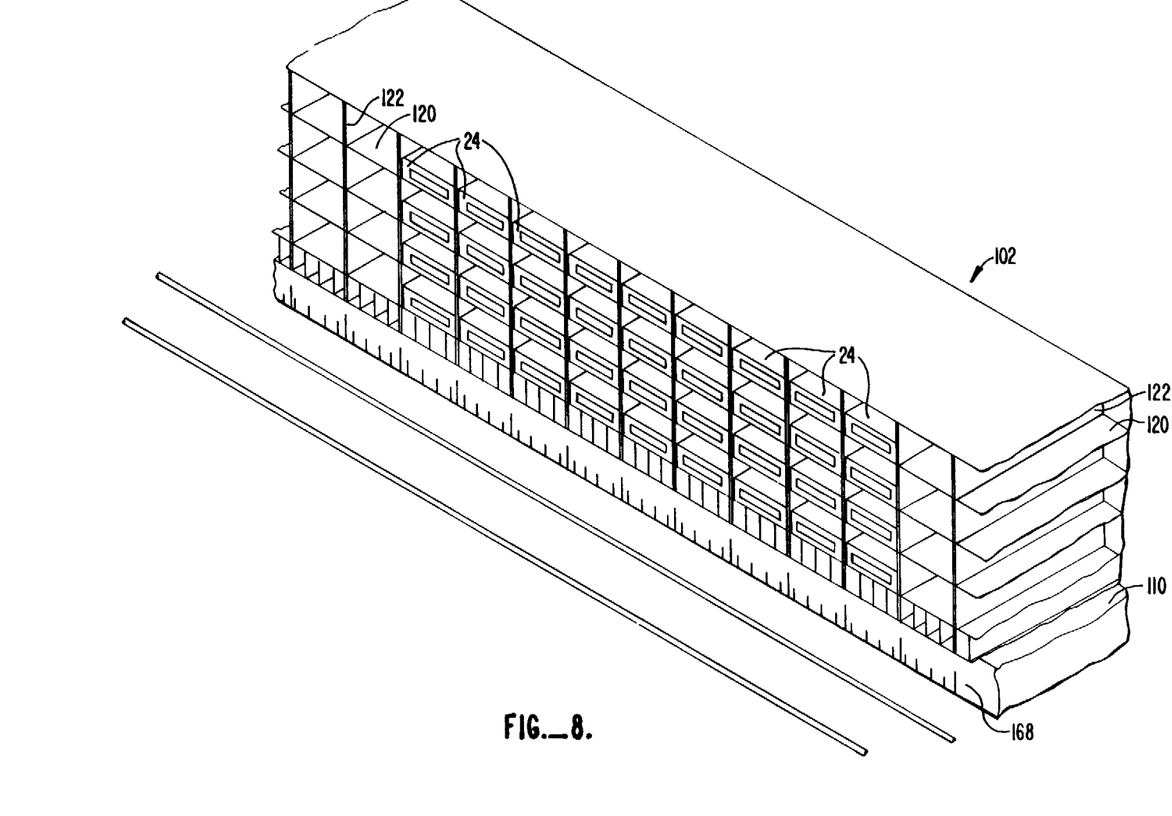
FIG. 8 is an orthogonal view of a portion of the front side of one bay of a modularized, fault tolerant computing facility adapted for automatic robotic maintenance apparatus and procedures comprising a second presently preferred embodiment of the present invention.
Figure 9:
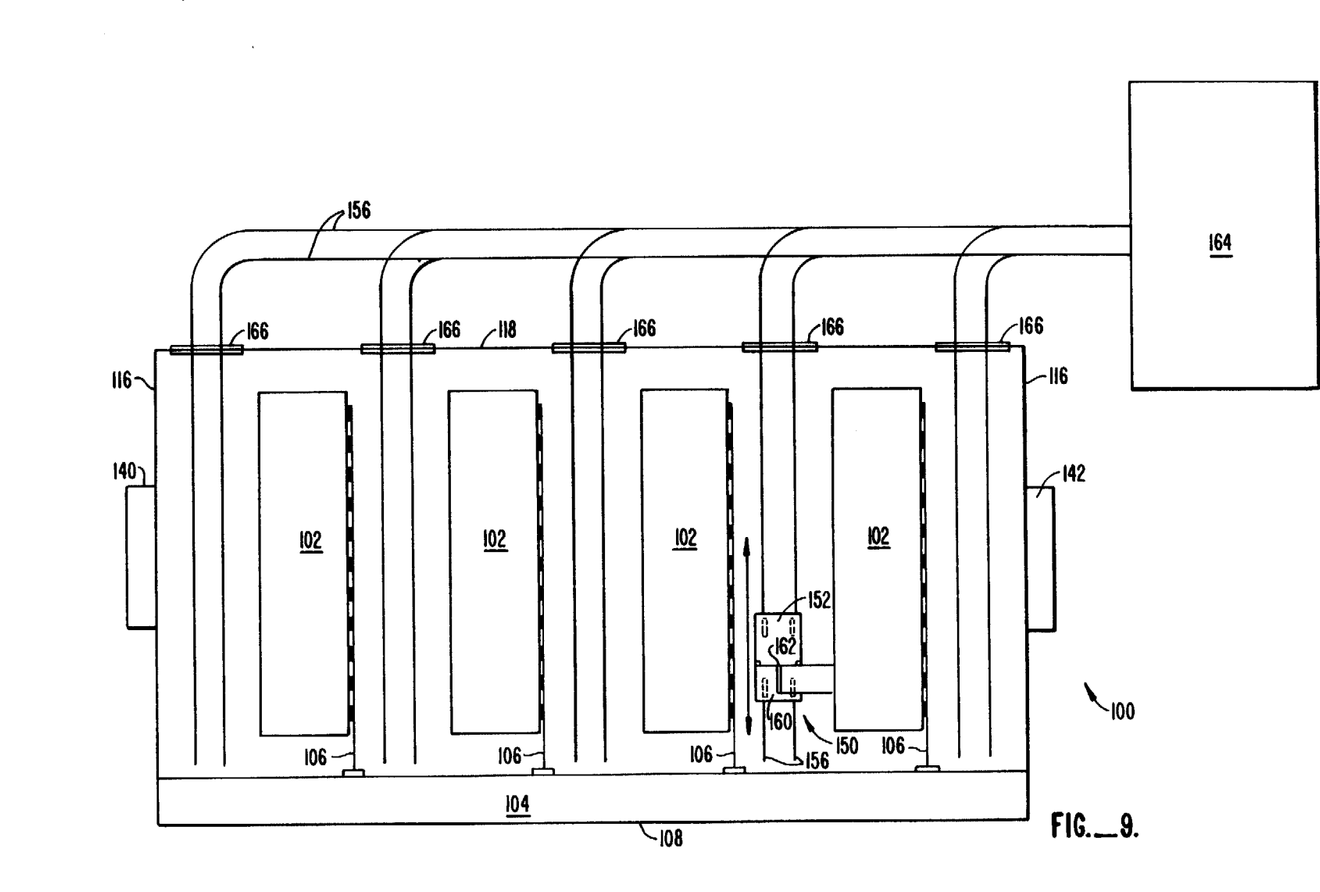
FIG. 9 is a diagrammatic top plan view of the overall computing facility which is partially depicted in the orthogonal view of FIG. 8.
Figure 10:
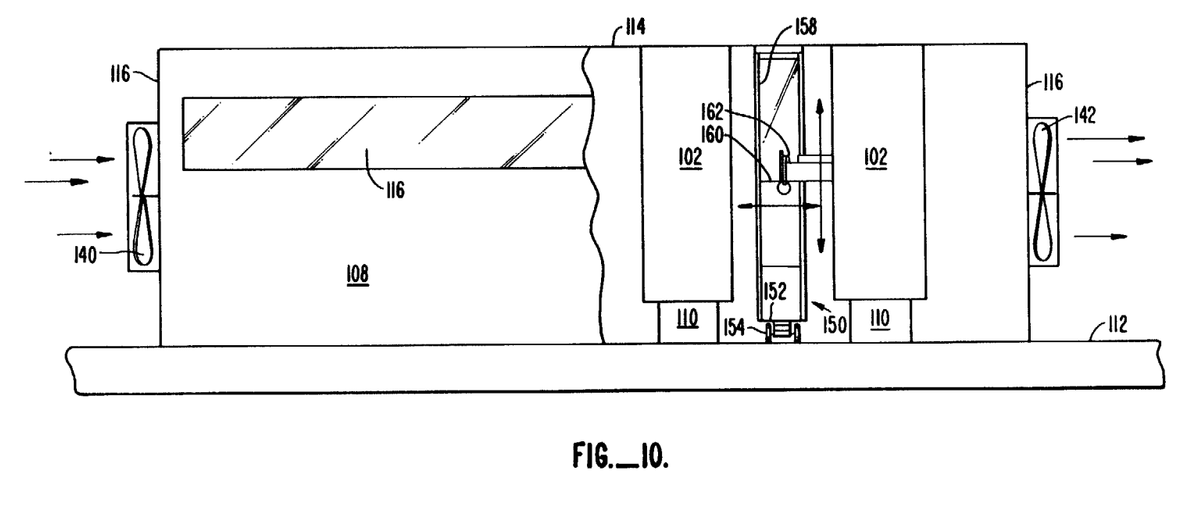
FIG. 10 is a diagrammatic front side view in elevation and partial section of the computing facility depicted in FIGS. 8 and 9.

A fault tolerant computing facility 100 employing the concept of standardized electrically and mechanically blind-mateable carrier module drawers, such as the drawer 24 depicted and previously discussed in conjunction with the subsystem 10, is illustrated in FIGS. 8-10. Therein, the facility is arranged into a group of four spaced apart, generally parallel equipment arrays or bays 102, a portion of one being shown in FIG. 8. The facility 100 provides for a computing system which may be expanded in virtually unlimited fashion, and also provides for and facilitates use of automatic robotic maintenance procedures and equipment. While the drawers 24 described in connection with the subsystem 10 are depicted in FIG. 8, it is to be understood that a hardware element other than a disk drive may be mounted in a particular drawer. For example, one drawer may include a central processor, another may include a peripheral processor, a third may include a device controller, a fourth may include central memory, and so forth.

As with the subsystem 10, each bay of the facility 100 provides an array of shelves 120 and vertical dividers 122 which define uniform spaces for the drawers 24. However, there is no requirement that the spaces be uniform, so long as they are accessible from a major side of each array 102. And, there is no constraint on the length of a particular bay 102, and a bay could be extended to any practical length in any dimension, remembering that the practical constraints are direct access to modules and cables and cable lengths between computing elements which limit the speeds at which control signals and data may be passed back and forth.

Shelves 128 and vertical dividers 130 are provided for e.g. four power supply modules 32 directly under each column of four spaces for the module drawers 24. Each power supply location is associated with a particular space for a drawer, so as to keep power supply cable lengths as short as practicable.

One arrangement of the facility is depicted in FIG. 9 wherein e.g. four parallel, spaced apart bays 102 are closely spaced from a back plane array 104 arranged normal to each bay. With this arrangement, cables 106 from each bay 102 may be plugged into and interconnected within the back plane array 104. The back plane array 104 may include monitoring apparatus and controls which are accessible to an operator at a control panel 116 along an outer wall 108.

Each array or bay 102 is mounted on a suitable pedestal 110 so that the spaces for modules and power supplies are elevated a suitable distance from the floor 112. The bays 102 and the back plane array 104 may be enclosed by a top wall 114, side walls 116, and a back wall 118 in order to define a forced air plenum for cooling the facility 100.

Cooling fans such as e.g. a pusher fan 140 and a puller fan 142 may be provided to move cooling air currents through the plenum and the bays 102 in order to draw off heat generated by the hardware elements within the module drawers 24 and the power supplies 32. While only two fans are illustrated, it is apparent that any number of cooling elements, whether air or liquid, and whether associated with the entire facility or with each one or a few adjacent drawers of a bay may be employed, it being remembered that one important concept of fault tolerance in computing systems is the avoidance of any single point of failure of the computing facility 100.

In accordance with an important aspect of the present invention, an industrial robot 150 is provided for maintenance, installation and/or reconfiguration procedures within the facility 100. The robot 150 may follow a variety of forms and be of any suitable structure. Its purpose is to be able to remove and replace any drawer 24, power supply 32 or cable 106 within the facility, automatically and without human operator intervention. One suitable form of robot 180 grossly resembles a remote controlled (by low powered local radio signals) fork lift and includes a platform 152 carried by a battery powered wheel carriage having wheels 154 which engage tracks 156 extending throughout the facility 100 at locations which give the robot 150 precise access to each space for every drawer 24 and power supply module 32. A vertical rack 158 enables a horizontal table 160 to move vertically between the spaces of a column of the array 102. The table 160 may be provided with a general or specific gripping mechanism 162 enable to the robot 180 to grasp each drawer 24 or power supply 32. Once the mechanism 162 has engaged e.g. the front panel 52 of a drawer 24, then the table 160 is translated horizontally in order to draw the drawer 24 from its space in the array.

The robot 150 then transports the drawer 24 and its hardware element contents to a suitable service area 164 where a replacement drawer 24 is available. The robot 150 deposits the drawer it just removed into a pick up area for a service technician, picks up the replacement drawer 24, returns to the particular space of the bay 102 from which the original drawer was removed and inserts and moves the new drawer 24 into the space until it becomes mechanically engaged and electrically connected in the manner previously described in connection with the subsystem 10.

The robot 180 is also provided with cable gripping equipment for removing and replacing each of the cables 106 under program control.

Doors or other suitable closures or strips 166 may be provided in the back wall 118 in the vicinity of the tracks 156 so that a forced air plenum arrangement is maintained while still providing access for the robot 180 to each of the arrays 102.

A locating system is provided for the robot 180 within the facility 100. One suitable indexing arrangement may be a scale 168 along the base 110 of each array 102. The scale 168 may be two dimensional and read optically by suitable optical sensors in the robot 150, or may be three dimensional and be read by electromechanical cam following equipment. Each drawer 24 is preferably provided with a unique bar code, such as a Universal Product Code, in a standard arrangement and location. An optical scanning device aboard the robot 150 may then scan the bar code to verify that the correct module is being removed for service.

The robot 150 operates automatically under program control. A special computer may be provided for the robot 150, or the computing facility 100 may include special service routines as part of its resources management in order to make effective use of the robot. In any event, the robot maintenance service program maintains a facilities resource map which records the precise location of each robotically accessible hardware element within the facility 100 and correlates an identifying number of each module, power supply and cable (preferably recorded on the bar code affixed to the particular element) with its present location. When e.g. a module 24 is replaced, the identifying number of the replacement module is substituted in the facilities map automatically during execution of the service program.

While tracks 156 are shown, painted lines may also be provided and followed by a steerable robot having suitable optional sensors for following the lines.

To those skilled in the art to which the present invention pertains many changes in construction and widely variant embodiments will be suggested without departure from the spirit and scope of the present invention. The description and the disclosures herein are presented by way of illustration of this invention and are not limiting of the scope thereof.

We claim:

1. A fault tolerant computing facility comprising at least one housing array including:
   a plurality of modules, each containing a hardware element of said computing facility,
   a plurality of modularized hardware element power supplies, there being a separate power supply module electrically associated with each said hardware element module,
   at least two separate power distribution modules, one power distribution module for distributing primary power from a first primary source connection to primary modules and power supply modules associated with primary modules, and a second primary source connection to back up mirror modules and power supply modules associated with back up mirror modules,
   interconnect means in said array enabling said hardware element modules and said power supply modules to become automatically disconnected and reconnected when said modules are removed and inserted therein.

2. The computing facility set forth in claim 1 further comprising at least two separate cooling means for cooling said hardware element modules and said power supply modules, and wherein said one power distribution module connects to one of said cooling means and wherein said second power distribution module connects to said other of said cooling means.

3. The computing facility set forth in claim 1 further comprising electrical configuration means, in said array and cooperatively associated with said interconnect means for enabling said array to be alternatively configured without physical modification of internal cabling as one of: a single string of hardware element modules; and, multiple strings of hardware element modules.

4. The computing facility set forth in claim 1 wherein each said hardware element module includes alignment means complementary with said array for mechanically aligning said module with said array so that said module is blind-mateable with said array and said interconnect means thereof.

5. The computing facility set forth in claim 1 further comprising control panel means for indicating conditions of hardware element modules and power supply modules installed in said array.

6. The computing facility set forth in claim 5 wherein said control panel means includes separate indicating means for indicating condition of a particular module with which it is associated.

7. The computing facility set forth in claim 1 wherein said housing array and said interconnect means automatically provide power, control and data signals and cooling for each said hardware element module upon installation into said array.

8. The computing facility set forth in claim 1 wherein said hardware element modules may be installed and removed from said array without tools.

9. The computing facility set forth in claim 1 wherein, said hardware element modules, power supply modules and interconnect means externally connecting to said array may be installed and removed automatically by robot.

10. The computing facility set forth in claim 1 wherein said housing array comprises internally an arrangement of shelves and wherein each said hardware element module is of dimensions compatible with a said shelf and comprises a carrier drawer for slidably engaging the said shelf of said array and including connecting means for connecting the hardware element of said module said with said interconnect means associated with the said shelf at a single location of connection.

11. The computing facility set forth in claim 5 wherein the logical identity of a said module is determined by programmable identification means on said control panel and by position of placement of each said module within said array.

12. The computing facility set forth in claim 1 wherein said array further comprises a data cable connector plane accessible directly from the outside for enabling data connection cables to be attached to said array, said data cable connector plane including a plurality of data jacks in electrical connection with module positions of said cabinet associated therewith.

13. The computing facility set forth in claim 1 wherein said plurality of modules includes at least one primary module and at least one back up mirror module for containing the same data as is stored in a said primary drive associated therewith.

14. The computing facility set forth in claim 1 wherein said array comprises a rotating fixed disk data storage subsystem and wherein each module thereof is associated with a disk drive.

15. A fault tolerant multiple disk data storage subsystem comprising a cabinet including:
   a plurality of disk drive modules, each containing a rotating disk data storage device,
   a plurality of modularized disk drive power supplies, there being a separate power supply module electrically associated with each said disk drive module,
   at least two separate power distribution modules, one power distribution module for distributing primary power from a first primary source connection to primary drive modules and power supply modules associated with primary drive modules, and a second primary source connection to back up mirror drive modules and power supply modules associated with back up mirror drive modules, interconnected means in said cabinet enabling said disk drive modules and said power supply modules to become automatically disconnected and reconnected when said modules are removed and inserted therein.

16. The data storage subsystem set forth in claim 15 further comprising at least two separate cooling means for cooling said disk drive modules and said power supply modules, and wherein said one power distribution module connects to one of said cooling means and wherein said second power distribution module connects to said other of said cooling means.

17. The data storage subsystem set forth in claim 15 further comprising electrical configuration means in said cabinet and cooperatively associated with said interconnect means for enabling said subsystem to be alternatively configured as a single string of daisy-chained disk drive modules and as two separate strings of daisy-chained disk drive modules without physical modification of internal cabling.

18. The data storage subsystem set forth in claim 15 wherein each said disk drive module includes alignment means complementary with said cabinet for mechanically aligning said module with said cabinet so that said module is blind-mateable with said cabinet and said interconnect means thereof.

19. The data storage subsystem set forth in claim 18 further comprising control panel means for indicating conditions of drive modules and power supply modules installed in said cabinet.

20. The data storage subsystem set forth in claim 19 wherein said control panel means includes separate indicating means for indicating condition of a particular drive module with which it is associated.

21. The data storage subsystem set forth in claim 15 wherein said cabinet and said interconnect means automatically provide power, control and data signals and cooling for each said disk drive module upon installation into said cabinet.

22. The data storage subsystem set forth in claim 15 wherein said drive modules may be installed and removed from said cabinet without tools.

23. The data storage subsystem set forth in claim 15 wherein said cabinet comprises internally an array of uniformly dimensioned shelves and wherein each said disk drive module is of uniform dimension and comprises a carrier drawer for slidably engaging said cabinet and including connecting means for connecting said drive with said interconnect means associated with a said shelf at a single location of connection.

24. The data storage subsystem set forth in claim 18 wherein the logical identity of a said disk drive module is determined by programmable identification means on said control panel and by position of placement of each said drive within said cabinet.

25. The data storage subsystem set forth in claim 15 wherein said cabinet further comprises a data cable connector plane accessible directly from the outside for enabling data connection cables to be attached to said cabinet, said data cable connector plane including a plurality of data jacks in electrical connection with disk drive positions of said cabinet associated therewith.

26. The data storage subsystem set forth in claim 15 wherein said plurality of disk drive modules includes at least one primary drive module and at least one back up mirror disk drive module for containing the same data as is stored in a said primary drive associated therewith.

27. A fault tolerant computing facility comprising at least one housing array including:
   a plurality of modules uniformly aligned in the array, each module containing a hardware element of said computing facility, and at least one spare hardware element module,
   interconnect means in said array enabling said hardware element modules to become automatically disconnected and reconnected within said facility when said modules are removed and inserted therein,
   robot means within said facility having direct access for removal a said module and replacement thereof with said spare hardware element module within said array under automatic control of a facility maintenance computing element of said facility.

* * * * *